United States Patent Office 3,582,494
Patented June 1, 1971

3,582,494
METHOD OF PREPARING ALKALINE SALT-FREE AQUEOUS COLLOIDAL SOLS
Peter H. Vossos, Berwyn, Ill., and Morris Mindick, Tyler, Tex., assignors to Nalco Chemical Company, Chicago, Ill.
No Drawing. Filed Mar. 27, 1968, Ser. No. 716,307
Int. Cl. B01j *13/00;* C01b *33/00*
U.S. Cl. 252—313                                8 Claims

ABSTRACT OF THE DISCLOSURE

A method of producing aqueous colloidal alkaline silica sols from salt-free acidic aqueous colloidal sols by treating such acidic sols with at least 0.003% by weight, based on the weight of the silica in such sol, of a salt whose anion is derived from a weak acid whose ionization constant should not exceed that of carbonic acid. After the addition of salt, the pH of the treated sol is adjusted to within the range 7.0–11.0.

---

This invention is directed to an improved method for making alkaline aqueous colloidal silica sols from acidic salt-free aqueous colloidal silica sols. There are several uses for aqueous colloidal silica sols which require that they be alkaline in pH, yet be substantially free of metal contaminants and other ionizable components. Illustrative of such applications wherein aqueous colloidal silica sols are used is in the manufacture of petroleum-treating catalysts. Examples of such catalysts are the well-known silica alumina cracking catalysts.

Another use for alkaline aqueous colloidal silica sols which are free of metals and certain undesirable anionic impurities is their employment in aqueous alkaline textile baths used to render cotton fabrics wrinkle-resistant.

It is well-known that when petroleum catalysts, particularly cracking catalysts, are prepared from aqueous colloidal silica sols it is necessary they be free of metal cations, such as sodium or potassium. Such metals greatly interfere with the catalytic activity of the finished catalysts. In a similar fashion, certain anions such as chlorides and sulfates are also undesirable components of finished petroleum cracking catalysts and, therefore, should not be present in aqueous colloidal silica sols when they are used in the manufacture of such catalysts.

In the treating of cotton fabrics with resinous materials such as dimethylol ethylene ureas, triazones and the like to render them wrinkle-resistant, it is important that such treating baths be free from undesirable metal contaminants such as sodium. When aqueous colloidal silica sols are used as adjuvants for such treating baths it is necessary that they be free from metal contaminants.

When aqueous colloidal sols are used in treating baths for textiles of the type described above and in the preparation of petroleum hydrocarbon cracking catalysts it is advantageous that these sols be alkaline in pH since they are frequently added to alkaline aqueous suspensions. If such sols are acidic, they tend to precipitate silica.

From the above discussion it is obvious that if a salt-free stable, alkaline colloidal silica sol were available to the art, that it would be a valuable product for use in the manufacturing of certain textile treatments and in the production of petroleum catalysts. Such sols should be easy to prepare and should be of a high degree of purity. A further benefit would be silica sols of the type described which would be alkaline with such alkalinity being capable of removal when these sols are used in industrial processes whereby substantially pure $SiO_2$ would be furnished to such processes.

The most effective method reported to date for producing salt-free aqueous colloidal silica sols are set forth in the teaching of Mindick et al. U.S. 3,342,747. The teachings of this patent are incorporated herein by reference.

In Mindick et al. U.S. 3,342,747 there is described what may be generically termed as a "double-deionization process" which effectively treats aqueous colloidal silica sols whereby they are converted to pure, finely-divided particles of silica suspended in a salt-free aqueous media. The processes set forth in U.S. 3,342,747 allow a wide variety of commercially available silica sols to be treated whereby they are freed from inorganic impurities. Typical of the commercially available aqueous colloidal silica sols which may be effectively treated in acordance with the teachings of U.S. 3,342,747 are set forth below in Table I:

TABLE I

|  | Nalcoag 1130[1] | Nalcoag 1030 | Nalcoag 1035 | Nalcoag 1050 |
|---|---|---|---|---|
| Percent colloidal silica as $SiO_2$ | 30 | 30 | 35–36 | 49–50 |
| pH | 10.0 | 10.2 | 8.6 | 9.0 |
| Viscosity at 77° F. cps | <10 | <5 | <5 | <5 |
| Specific gravity at 68° F | 1.214 | 1.205 | 1.255 | 1.385 |
| Average surface area, mol/gram of $SiO_2$ | 375 | 190–270 | 135–190 | 120–150 |
| Average particle size, millimicrons | 7–9 | 11–16 | 16–22 | 20–25 |
| Density, number/gallon at 68° F | 10.1 | 10.0 | 10.5 | 11.6 |
| Freezing point, degree F | 32 | 32 | 32 | 32 |
| $Na_2O$ percent | 0.65 | 0.40 | 0.10 | 0.3 |

[1] Trademark, Nalco Chemical Company.

When sols are treated in accordance with U.S. 3,342,747 there are produced finished silica sols characterized as containing from 3–50% by weight of silica and having specific surface areas ranging between 59–800 m.$^2$/g. These pure salt-free sols have pH's ranging between 2.6–3.8 and preferably between 2.9 and 3.5. Sols produced in accordance with U.S. 3,342,747 show little or no change in pH under conditions of long-term storage as evidenced by elevated temperature storage conducted at 120° F. for one month and for 20 weeks.

Since the sols produced by U.S. 3,342,747 are salt-free it would seem a simple matter to merely adjust the pH of the sols from an appropriate basic material to render them alkaline. Actual experience, however, has demonstrated that mere pH adjustment is not entirely satisfactory when it is desired to form stable alkaline sols from the sols produced in accordance with U.S. 3,342,747.

Illustrative of this phenomenon is the attempted alkalization of a silica sol which contains a silica content of about 34% by weight and has a pH of 3.1 and average particle size within the range of 16–22 millimicrons. When solutions of a basic substance such as sodium hydroxide or ammonium hydroxide are added to these sols and the pH adjusted to the range of 9 to 10, the viscosity of the finished material increases several times over the viscosity of the starting salt-free acid sol. As the pH passes through the range between 4–7, thickening frequently occurs.

Such sols when merely raised to an alkaline pH are frequently sufficiently unstable that they gel within a matter of a few days to a few weeks. In similar cases small particle size diameter sols which were salt-free and produced in accordance with U.S. 3,342,747 when treated with basic material to adjust their pH on the alkaline side the stability is dramatically reduced from a period of several years down to several months. Thus, it may be said that the mere alkalizing of a deionized or salt-free sol of the type produced in U.S. 3,342,747 may not be readily accomplished by mere pH adjustment alone with conventional inorganic basic materials.

The problem of pH adjustment where such salt-free alkaline sols are desired for commercial usage is further complicated by the fact that the introduction of metallic ions is often undesirable. Such conventional inorganic basic materials as alkali metal hydroxides, alkali metal silicates and basic metal salts cannot be used to adjust salt-free silica sols to alkaline pH's where the presence of metal ions is considered an undesirable component of the sol. Therefore, to provide an alkaline sol having desirable salt and metal-free characteristics it is necessary that the pH of the sol be adjusted with a basic material which may be readily removed by such means as the application of heat or vacuum after the sol is introduced into subsequent industrial processes. Such requirements, therefore, limit drastically the type of basic materials that may be used to adjust the pH of salt-free acidic aqueous colloidal silica sols. Therefore, to achieve the effect, it is necessary to use ammonium basis such as ammonium hydroxide or substituted ammonium hydroxides such as the lower quaternary ammonium hydroxides.

As indicated above, when such materials are used directly they destroy the long-term storage characteristics of the salt-free acidic sols and also in those cases where large particle sols are involved, the direct adjustment with these materials of the pH to an alkaline range tends to produce extremely viscous products which are unsuitable for many industrial applications.

It would be a desirable benefit to the art if it were possible to produce alkaline salt-free silica sols which could be produced from salt-free silica sols of the type described in U.S. 3,342,747 without materially changing the viscosity of the alkaline sols. Such a process also should produce a finished sol which had long-term storage characteristics and would provide an alkaline sol whose alkalinity components could be readily removed from industrial systems into which the sols are incorporated.

OBJECTS OF THE INVENTION

Based on the above it becomes an object of the invention to provide a method of producing alkaline aqueous colloidal silica sols from salt-free acidic aqueous colloidal silica sols.

Another object of the invention is to produce alkaline salt-free sols which contain basic materials which may be readily removed therefrom.

A further object is to produce alkaline salt-free aqueous colloidal silica sols which do not contain metal ions and which are free from certain undesirable anionic components. Other objects will appear hereinafter.

THE INVENTION

In accordance with the invention it has been found that salt-free aqueous colloidal silica sols of the type described in U.S. 3,342,747 having a silica concentration within the range of 3% to about 50% by weight may be rendered alkaline without appreciably changing their stability or viscosity characteristics without introducing therein undesirable metallic components or anionic components.

Stability and relatively low viscosity will be retained by practicing the teachings of this invention in bringing the salt-free aqueous colloidal silica sols from their acidic pH range to the desired alkaline pH range.

For certain commercial utilizations the acidic salt-free aqueous colloidal silica sol must be brought up to a pH value of at least 7.0. This may be done by adding a sufficient amount of alkaline water-soluble material to the sol. Preferred basic water-soluble chemicals are exemplified by ammonium hydroxide and certain water-soluble quaternary ammonium hydroxides illustrated by such compounds as tetramethyl ammonium hydroxide, diethyl dimethyl ammonium hydroxide, tetraethyl ammonium hydroxide, and the like. Since the quaternary ammonium hydroxides are expensive compounds, it is most convenient to use ammonium hydroxide.

When ammonium hydroxide is used to adjust the basicity of the sol to within the range 7.0 to about 11, the finished sol is then compatible with alkaline systems of the type commonly utilized in catalyst manufacture and in baths for wrinkle-proofing of textiles.

However, in passing the pH range of 5–7, the sol will start to thicken or become viscous due to the agglomeration of the particles. As a consequence when a 7–11 pH value is reached the sol is more viscous than it should be.

A method has been discovered to reduce to a minimum the referred to thickening or increase in viscosity effect which results in passing through the 5–7 pH range. Specifically it has been found that the addition of water soluble metal-free salts to the sol prior to alkalization prevents this gelling effect. At least 0.003% by weight (based on the weight of the silica in the sol) of a metal-free salt whose anion is derived from a weak acid, should be added. The ionization constant of this weak acid should be less than that of carbonic acid. The referred to metal-free salt may be one of ammonia or an organic nitrogen base which contains not more than 12 carbon atoms. Compounds falling within this definition include such ammonium salts as ammonium carbonate, ammonium bicarbonate, ammonium sulfide and ammonium cyanide. Less preferred compounds also falling within the above definition are the carbonates, sulfides, cyanides of the lower aliphatic and heterocyclic amines which contain not more than 12 carbon atoms. Illustrative are the carbonates of mono, di and tri, methyl, ethyl and propyl amines, as well as the carbonates of morpholine, pyridine, and other cyclic amines and substituted cyclic amines.

The salts of the types described above are used at a concentration sufficient to provide at least 0.003% by weight based on the weight of the silica ($SiO_2$) present in the acidic salt-free silica sol treated. It has been found that good results are obtained when the dosage range of the sols is between 0.03–0.3% by weight and in some instances as much as 0.5% by weight may be utilized in order to allow the sol to be ready for alkalizing with an appropriate base for purposes of subsequent pH adjustment. As a general rule, more salt would be required for the smaller particle-size sols.

The metal-free salts of the type described above should be water-soluble and preferably added to the salt-free acidic silica sols as aqueous solutions. The strength of the solutions should be as concentrated as possible to minimize further dilution of the silica sol produced where silica concentration is an important factor. In certain cases the salts may be added directly to the sols as solids but this is undesirable from the standpoint that they tend to be difficult to dissolve and may set up local zones of excessively high salt concentration which would destabilize some of the silica present in the starting acid sols.

After the sols have been treated with weakly ionized metal-free salts, which in a preferred embodiment is ammonium carbonate, the acid sols may then be alkalized with an appropriate base to provide a finished pH of at least 7.0 and preferably within the range of 9 to 10. The pH may be elevated to as great a value of 11, although this pH is not usually necessary to insure stability, particularly where ammonium hydroxide or similar volatile nitrogen-type base is used.

It should be noted that the time interval between formation of the acidic salt-free aqueous silica sol and addition of the water-soluble metal-free salt and alkalinization is a function of particle diameter.

Those silica sols having particle diameter in excess of 20 m$\mu$ do not require the addition of the metal-free salt until immediately prior to alkalinization.

Silica sols having particle diameters in the range of 10–20 m$\mu$ require the addition of metal-free salts within 5–2880 minutes of formation of the acidic salt-free aqueous silica sol.

Silica sols having particle diameters less than 10 m$\mu$ require the addition of the metal-free salts within 5–1440 minutes after the formation of the acidic salt-free aqueous silica sol. Preferably, the addition of the water-soluble metal-free salt and the alkalinization steps should take place within 3 hours.

If there should be an unreasonable delay before the addition of the water-soluble metal-free salt and alkalinization, the resulting product will not be as stable or non-viscous as it would otherwise be. An unreasonable delay, as inferred above, will be a period of time in excess of 2880 minutes for sols having particle diameters in the range 10–22 m$\mu$ and 1440 minutes for those silica sols having particle diameters less than 10 m$\mu$. It should further be noted that greater delays result in sols having higher viscosity and less stability. Therefore increases in viscosity and unstability are directly proportional to delay. Eventually if there is a great enough delay, the sol product will become worthless.

The above procedure thereby provides a finished sol which is alkaline in pH yet which will release its alkaline components upon application of heat to provide a sol which contains relatively pure silica. Such sols are extremely valuable in the production of petroleum catalysts which are used in the cracking operations to produce valuable petroleum fractions. Thus it is now possible for the art to utilize alkaline sols which are capable of furnishing pure and uncontaminated finely-divided dense silica particles.

There is yet another, less attractive method to achieve similar results to those taught above. It is feasible to postpone the addition of the water-soluble, metal-free salt to the sol system subsequent to alkalization.

The addition of water-soluble, metal-free salts subsequent to alkalinization has been found to reduce the sol's viscosity which increased as a result of passing the 5–7 pH range. This method has one serious drawback. Although the sol viscosity is reduced, stability of the sol is also reduced.

The stability reduction is not of serious magnitude but it does not meet with the stability of the sol wherein the water-soluble, metal-free salt was added prior to alkalinization.

The preferred practices of the invention therefore comprise first treating the sol with ammonium carbonate and then adjusting the pH within the range specified with ammonium hydroxide. This procedure thereby provides a finished sol which is alkaline in pH yet which will release its alkaline components upon application of heat to provide a sol which contains relatively pure silica. Such sols are extremely valuable in the production of petroleum catalysts which are used in the cracking operations to produce valuable petroleum fractions. Thus it is now possible for the art to utilize alkaline sols which are capable of furnishing pure and uncontaminated finely-divided dense silica particles.

EXAMPLES

To illustrate the preparative techniques used in the practices of the invention the following are given by way of example.

Example I

A 35% $SiO_2$ alkaline silica sol (Nalcoag 1035—Table I) was treated in accordance with Example I of U.S. 3,342,747. The resultant deionized sol was characterized as having a pH of about 3.1 and a conductance of about 340 micromhos. The product was permanently stable. A small sample of this sol was used for the purposes of experimentation.

A 10% solution of ammonium carbonate in deionized water was prepared and added slowly with good stirring to provide 0.0175% ammonium carbonate based on the above sol which was diluted to 30%. This gave 0.0574 pound of ammonium carbonate per every 100 pounds of silica. After complete dissolution of the ammonium carbonate was obtained, ammonia was slowly bubbled into the sol until the pH reached 9.4 at which time the ammonia feed was stopped. This pH approximated 0.785 pound of ammonia per 100 pounds of $SiO_2$ furnished. During the final portion of the ammonia addition feed was intermittently interrupted so that the final pH was not exceeded. The above sol was put under long-term storage tests at a temperature of 140° F. in a pressurized container and was found to be stable for 20 weeks. This gave an expected shelf storage life of over one year.

In contrast a sample of the same starting sol was treated with gaseous ammonia to produce a pH of 9.4. At the end of one week at a sustained temperature of 140° F. the viscosity of the sol had so increased that it was considered to be useless commercially.

Sols produced in accordance with Example I are extremely stable, do not evidence any substantial increase in viscosity, yet at the same time may be rendered salt-free by the application of heat. Due to their alkalinity they may be safely incorporated into aqueous alkaline systems such as catalyst preparative solutions and the like without the danger of silica precipitation occurring.

Example II

A 30% $SiO_2$ alkaline silica sol was treated in accordance with Example I of U.S. 3,342,747. The physical properties of the referred to silica sol before and after deionization are as follows:

|  | Prior to deionization | Subsequent to deionization |
|---|---|---|
| Particle diameter | 14.4 | 14.4 |
| Specific gravity | 1.257 | 1.252 |
| Viscosity, Cps | 5.4 | 3.28 |
| pH | 9.0 | 3.0 |
| Conductance | 3,200 | 225 |

Upon deionization 95% of $Na_2O$ was removed. The stability of the deionized colloidal silica sol at room temperature was 6 months.

A 10% solution of ammonium carbonate in deionized water was prepared and slowly added with good stirring to provide 0.017% by weight ammonium carbonate based on the above sol. After complete dissolution of the ammonium carbonate was obtained, 0.23 moles of ammonium in the form of ammonium hydroxide was slowly added with good stirring into the sol until the pH reached 9.54. The above sol was put under long-term storage tests at a temperature of 140° F. in a pressurized container and was found to be stable for 20 weeks. This gave an unexpected shelf life of over one year. The starting sol prior to addition of ammonium carbonate had a specific gravity of 1.252. At the end of the alkali addition the specific gravity was found to be 1.211.

In contrast a sample of the same starting sol was treated with gaseous ammonia to produce a pH of 9.4. At the end of one week at a sustained temperature of 140° the viscosity of the sol had so increased that it was considered to be commercially useless.

Sols produced in accordance with Example II are extremely stable. They do not evidence any substantial increase in viscosity, yet at the same time may be rendered salt-free by the application of heat. Due to their alkalinity they may be safely incorporated into aqueous alkaline systems such as catalyst preparative solutions and the like without the danger of silica precipitation occurring.

Example III

A 30% by weight $SiO_2$ colloidal silica sol having a particle diameter of 7.4 m$\mu$ was formed. The formed sol was divided into two equal volumes A and B. Volume A was submitted to a single deionization step in accordance with the teachings of U.S. 3,342,747. Volume B was submitted twice to a deionization step in accordance with the teachings of U.S. 3,342,747.

Volume A was found to gel in 4 days upon standing at room temperature.

Volume B was found to gel in 7 days upon standing at room temperature.

Example IV

To illustrate the effect of the need for the immediacy of water-soluble, metal-free salt addition followed by alkalinization of a 30% by weight acidic salt-free aqueous colloidal silica sol, based on $SiO_2$ and having a 7.4 m$\mu$ particle diameter to attain a more stable and less viscous system, the following are given:

(A) A singly deionized viscous sol was immediately alkalized to a pH of 8.2. 0.13% (based on $SiO_2$ wt.) ammonium carbonate was immediately added. The viscosity was reduced from a value greater than 100 to 8 cps. The product remained stable for a period greater than one year at room temperature.

(B) A singularly deionized viscous sol was alkalized to a pH of 8.2 *after* a one day period. 0.31% (based on $SiO_2$ wt.) ammonium carbonate was added to the system immediately thereafter. The viscosity of the sol was reduced from a value greater than 100 to 15 cps. The product remained stable for 36 days at room temperature.

(C) A twice-deionized sol was allowed to stand for three days. Thereafter its substance was of a "soft" gel nature having a viscosity greater than 100 cps. This system was then alkalized to a pH value of 8.7. 0.36% ammonium carbonate ($SiO_2$ wt. basis) was added to the system after alkalization. The viscosity of the system was reduced to 15 cps. Aging tests indicate that the system would remain stable for a period considerably greater than one year, upon standing at room temperature.

(D) After four days of standing 0.36% ammonium carbonate (based on $SiO_2$) was added to a twice-deionized slightly viscous sol having a viscosity of 83 cps. After the addition, viscosity dropped to 33 cps. Ammonium hydroxide was then added until a pH value of 8.8 was reached. The viscosity remained 33 cps. This system was stable for a 6-month period standing at room temperature.

CONCLUSION

Based on the above it is evident that the invention provides to the art an improvement for alkalizing acidic silica sols; thereby making them compatible with alkaline industrial process systems. In a preferred embodiment the invention provides alkaline silica sols which are free from undesirable metal or anionic components which may be treated by means of heat, vacuum, or the like, to free the alkaline stabilizing material from the sol, thereby providing to industrial processes such as catalyst manufacture with extremely purified dense particles of silica which are useful components in such processes.

Having thus described our invention, it is claimed as follows:

1. A method of producing an aqueous colloidal alkaline silica sol from a salt-free acidic aqueous colloidal silica sol which comprises the addition to the salt-free acidic sol of from 0.003% to 0.5% by weight based on the weight of silica of a metal-free salt of ammonia or an organic nitrogen base which contains not more than 12 carbon atoms, and where the anion of said salt is characterized as being derived from a weak acid whose ionization constant is equal to or less than that of carbonic acid, and the adjustment of the pH of the sol to within the range of from 7.0 to 11.0.

2. The method of claim 1 whereby the steps of addition of the water-soluble metal-free salt of ammonia or an organic nitrogen base which contains not more than 12 carbon atoms and adjustments of the pH of the sole to within the range of 7.0–11.0 are to take place within 5–1440 minutes for silica sols having particle diameters less than 10 m$\mu$, 5–2880 minutes for silica sols having particle diameters in the range of 10–20 m$\mu$, immediately prior to alkalinization for silica sols having particle diameters in excess of 20 m$\mu$.

3. The method of claim 1 whereby the addition of the water-soluble metal-free salt of ammonia or an organic nitrogen base which contains not more than 12 carbon atoms is to take place subsequent to the adjustment of the pH of the sol to within the range of 7.0 to 11.0.

4. The method of claim 1 where the pH of the sol is adjusted to between 7.0 to 11.0 with the hydroxide of a non-metallic cation.

5. The method of claim 2 whereby the addition of the water-soluble metal-free salt of ammonia or an organic nitrogen base which contains not more than 12 carbon atoms is to take place subsequent to the adjustment of the pH of the sol to within the range of 7.0 to 11.0.

6. The method of claim 4 where the hydroxide of the non-metallic cation is ammonium hydroxide.

7. A method of producing an aqueous collodial alkaline silica sol from a salt-free acidic aqueous colloidal silica sol which contains from 3–50% by weight silica expressed as $SiO_2$, which comprises the steps of adding to the salt-free acidic sol from 0.003 to 0.3% by weight of ammonium carbonate and then adjusting the pH of the sol to within the range of from 9.0 to 10.0.

8. The method of claim 7 where the pH of the sol is adjusted to between 9.0 to 10.0 with ammonium hydroxide.

References Cited

UNITED STATES PATENTS

| | | | |
|---|---|---|---|
| 2,601,352 | 6/1952 | Wolter | 252—313 |
| 3,342,747 | 9/1967 | Mindick et al. | 252—313 |
| 3,419,495 | 12/1968 | Weldes et al. | 251—313X |

RICHARD D. LOVERING, Primary Examiner

U.S. Cl. X.R.

23—182; 117—139.4; 252—449, 455

PO-1050
(5/69)

UNITED STATES PATENT OFFICE
CERTIFICATE OF CORRECTION

Patent No. 3,582,494      Dated June 1, 1971

Inventor(s) Peter H. Vossos et al

It is certified that error appears in the above-identified patent and that said Letters Patent are hereby corrected as shown below:

Column 2, Table I, "Average surface area, mol/gram of $SiO_2$" should read --Average surface area, $m^2$/gram of $SiO_2$--.

Column 2, Table I, "Density, number/gallon at 68°F." should read --Density, pounds/gallon at 68°F.--.

Column 2, line 53, after "storage" insert --tests--.

Column 8, line 19, "sole" should read --sol--.

Signed and sealed this 25th day of January 1972.

(SEAL)
Attest:

EDWARD M. FLETCHER, JR.
Attesting Officer

ROBERT GOTTSCHALK
Commissioner of Patents